(12) United States Patent
Asano et al.

(10) Patent No.: US 10,547,242 B2
(45) Date of Patent: Jan. 28, 2020

(54) POWER SUPPLY APPARATUS AND IMAGE FORMING APPARATUS (71) Applicant: CANON KABUSHIKI KAISHA, Tokyo (JP)

(72) Inventors: Hiroki Asano, Kawasaki (JP); Yasuhiro Shimura, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/141,355

(22) Filed: Sep. 25, 2018

(65) Prior Publication Data
US 2019/0098159 A1 Mar. 28, 2019

(30) Foreign Application Priority Data
Sep. 28, 2017 (JP) ................. 2017-188213

(51) Int. Cl.
H02M 3/335 (2006.01)
H04N 1/00 (2006.01)
H02M 1/00 (2006.01)

(52) U.S. Cl.
CPC ... *H02M 3/33507* (2013.01); *H02M 3/33523* (2013.01); *H02M 2001/0022* (2013.01); *H04N 1/00888* (2013.01)

(58) Field of Classification Search
CPC ............. H02M 3/335; H02M 3/33507; H02M 3/33523; H02M 2001/0022
See application file for complete search history.

(56) References Cited

U.S. PATENT DOCUMENTS

| 9,823,617 B2 | 11/2017 | Shimura et al. |
| 9,897,964 B2 | 2/2018 | Shimura |
| 9,966,865 B2 | 5/2018 | Shimura et al. |
| 2011/0205770 A1* | 8/2011 | Isogai ............ H02M 1/32 363/78 |

(Continued)

FOREIGN PATENT DOCUMENTS

| JP | 2007-68254 | 3/2007 |
| JP | 2014-39383 | 2/2014 |

OTHER PUBLICATIONS

U.S. Appl. No. 15/958,344, filed Apr. 20, 2018, by Yasuhiro Shimura et al.

(Continued)

Primary Examiner — Fred E Finch, III
Assistant Examiner — Rafael O. De León Domenech
(74) Attorney, Agent, or Firm — Venable LLP (57) ABSTRACT The power supply apparatus includes a transformer, a switching unit provided on a primary side of the transformer and configured to perform switching operation for converting an input voltage resulting from rectification and smoothing of an AC voltage and outputting an output voltage from a secondary side of the transformer; a first detection unit configured to detect the output voltage, a feedback unit configured to generate a feedback voltage based on the voltage detected by the first detection unit; a control unit configured to control the switching operation of the switching unit based on the feedback voltage generated by the feedback unit; and a second detection unit configured to detect the AC voltage.

13 Claims, 5 Drawing Sheets (56) References Cited

U.S. PATENT DOCUMENTS

| | | | | |
|---|---|---|---|---|
| 2013/0108303 A1* | 5/2013 | Samejima | .................. | H02J 3/24 |
| | | | | 399/88 |
| 2013/0272031 A1* | 10/2013 | Hosotani | ........... | H02M 3/33569 |
| | | | | 363/16 |
| 2013/0279204 A1* | 10/2013 | Yang | .................. | H02M 3/33507 |
| | | | | 363/21.01 |
| 2014/0301114 A1* | 10/2014 | Matsumoto | ....... | H02M 3/33523 |
| | | | | 363/21.12 |
| 2015/0016152 A1* | 1/2015 | Kojima | .................. | G03G 15/80 |
| | | | | 363/21.02 |
| 2015/0249397 A1* | 9/2015 | Ogasawara | ......... | H02M 1/4266 |
| | | | | 315/200 R |
| 2016/0226388 A1* | 8/2016 | Ren | ................... | H02M 3/33507 |
| 2017/0176918 A1 | 6/2017 | Shimura et al. | | |
| 2018/0212508 A1 | 7/2018 | Kobayashi et al. | | |
| 2019/0140546 A1* | 5/2019 | Asao | ................. | H02M 3/33507 |

OTHER PUBLICATIONS

U.S. Appl. No. 16/030,499, filed Jul. 9, 2018, by Yusuke Saito et al.
U.S. Appl. No. 16/058,280, filed Aug. 8, 2018, by Hiroki Asano et al.
U.S. Appl. No. 16/058,289, filed Aug. 8, 2018, by Yasuhiro Shimura et al.
U.S. Appl. No. 16/057,636, filed Aug. 7, 2018, by Yasuhiro Shimura et al.

* cited by examiner

POWER SUPPLY APPARATUS AND IMAGE FORMING APPARATUS

BACKGROUND OF THE INVENTION

Field of the Invention

The present invention relates to a power supply apparatus and an image forming apparatus, and more particularly to a control technique for minimizing increases in cost and size of the power supply apparatus.

Description of the Related Art

A power supply apparatus typically determines the conduction time period or ON-duty of a switching element according to a voltage (hereinafter referred to as a feedback voltage) obtained via a feedback unit from an output voltage. The conduction time period or ON-duty required for achieving a necessary output voltage is shorter as an AC voltage (an input voltage) of a commercial AC power supply is lower, and is longer as the input voltage is higher. Therefore, it is often the case that a lower input voltage causes lower responsivity of the output voltage, resulting in an increase in the output voltage variation due to load variation, while a higher input voltage causes greater ripple of the output voltage. To realize a stable power supply apparatus within the range of ratings of the input voltage, it is desirable to have a design that minimizes the influence of disturbances such as the input voltage.

For example, Japanese Patent Applications Laid-Open Nos. 2007-068254 and 2014-039383 disclose techniques for reducing the influence of the input voltage. In these techniques, the relationship of the variation amount of the conduction time period or ON-duty of the switching element with the variation amount of the feedback voltage is taken into account to correct the conduction time period or ON-duty according to the input voltage. This enables both the responsivity of the output voltage and the reduction of ripple of the output voltage to be achieved for any input voltage.

Specifically, the above-described correction corrects, according to the input voltage, the gradient of a function that represents the relationship between the feedback voltage and the conduction time period or ON-duty of the switching element. However, correction of the intercept of the function is not taken into account. This is because the value itself of the feedback voltage is unimportant. That is, if a constant-current source circuit is used for the feedback unit, the variation amount per unit time of the feedback voltage is the same whatever the value of the feedback voltage is.

For the purpose of cost reduction, a filter circuit that includes a constant-voltage source, a resistor and a capacitor may be used for the feedback unit instead of an expensive constant-current source circuit. In this case, however, the variation amount per unit time of the feedback voltage depends on the value of the feedback voltage. This means that the responsivity of the feedback control of the power supply apparatus depends on the value of the feedback voltage. The power supply apparatus is thus affected by the input voltage, and this may lead to the difficulty in achievement of both the responsivity of the output voltage and the improvement of ripple of the output voltage, and to increased evaluation man-hours in designing.

SUMMARY OF THE INVENTION

An aspect of the present invention is an inexpensive and small-sized power supply apparatus that achieves both the improvement of responsivity of output voltage and the reduction of ripple of the output voltage within the range of ratings of input voltage.

Another aspect of the present invention is a power supply apparatus including a transformer configured to isolate a primary side and a secondary side, a switching unit provided on the primary side of the transformer and configured to perform switching operation for converting an input voltage in which an AC voltage are rectified and smoothed and outputting an output voltage from the secondary side of the transformer, a first detection unit configured to detect the output voltage, a feedback unit configured to generate a feedback voltage based on the voltage detected by the first detection unit; a control unit configured to control the switching operation of the switching unit based on the feedback voltage generated by the feedback unit; and a second detection unit configured to detect the AC voltage. The control unit performs the switching operation such that the higher the AC voltage detected by the second detection unit, the shorter a conduction time period of the switching unit corresponding to the feedback voltage and the smaller a variation amount of the conduction time period of the switching unit corresponding to a variation amount of the feedback voltage.

A further aspect of the present invention is an image forming apparatus including: an image forming unit for forming an image, and a power supply apparatus configured to power the image forming apparatus, wherein the power supply apparatus includes: a transformer configured to isolate a primary side and a secondary side, a switching unit provided on the primary side of the transformer and configured to perform switching operation for converting an input voltage in which an AC voltage are rectified and smoothed and outputting an output voltage from the secondary side of the transformer, a first detection unit configured to detect the output voltage; a feedback unit configured to generate a feedback voltage based on the voltage detected by the first detection unit; a control unit configured to control the switching operation of the switching unit based on the feedback voltage generated by the feedback unit; and a second detection unit configured to detect the AC voltage. The control unit performs the switching operation such that the higher the AC voltage detected by the second detection unit, the shorter a conduction time period of the switching unit corresponding to the feedback voltage and the smaller a variation amount of the conduction time period of the switching unit corresponding to a variation amount of the feedback voltage.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

With reference to the drawings, embodiments for implementing the present invention will be described below in detail by way of example.

[Power Supply Apparatus]

Figure 1:
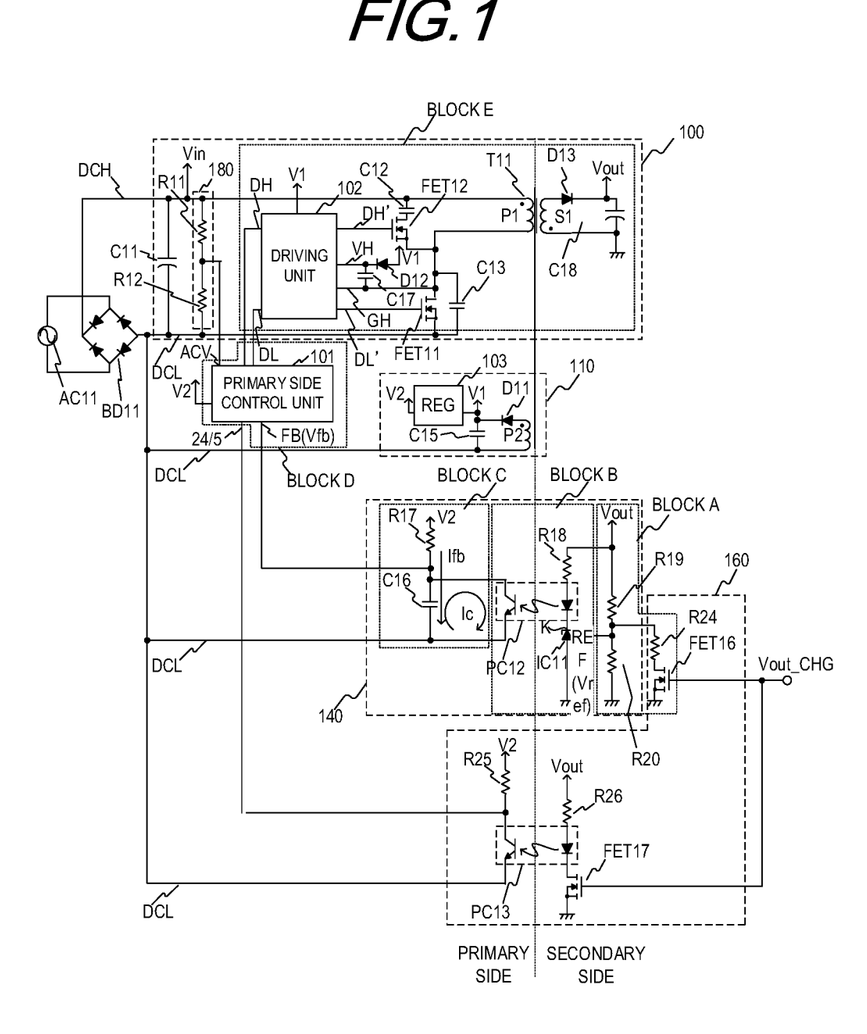
FIG. 1 is a circuit diagram of a power supply apparatus in first and second embodiments.

A circuit of a power supply apparatus in a first embodiment will be described with reference to FIG. 1. An AC voltage output from an AC power supply AC11 is full-wave rectified by a bridge diode BD11 and smoothed by a smoothing capacitor C11. DCH and DCL respectively denote potentials on the higher-voltage side and lower-voltage side of the smoothing capacitor C11. The difference between the DCH and the DCL is an input voltage Vin. An isolated DCDC converter 100 (a conversion unit) converts the input voltage Vin charged to the smoothing capacitor C11 and outputs a power supply voltage Vout (an output voltage) to an isolated secondary side via a transformer T11. Although the isolated DCDC converter 100 in the first embodiment employs the scheme of a flyback power supply using active clamp, the isolated DCDC converter 100 may also employ a flyback scheme using one transistor. The transformer T11 is an isolation transformer that includes a primary winding P1 and an auxiliary winding P2 on the primary side and a secondary winding S1 on the secondary side. Energy is supplied from the primary winding P1 to the secondary winding S1 by switching operation.

A field-effect transistor 11 (hereinafter referred to as an FET11), which is a first switching element, is connected in series with the primary winding P1 of the transformer T11. A capacitor C12 for voltage clamp and a field-effect transistor 12 (hereinafter referred to as an FET12), which is a second switching element, are connected in series with each other. The circuit of the serially connected capacitor C12 and FET12 is connected in parallel to the primary winding P1. A resonance capacitor C13 is connected in parallel to the FET11. Instead of providing the resonance capacitor C13, parasitic capacitance between the drain terminal and the source terminal present at the FET11 may also be used.

Turning on and off the FET11 and the FET12 is controlled by a primary side control unit 101 (a control unit). The primary side control unit 101 outputs an on-off signal DL for the FET11 and an on-off signal DH for the FET12, which are received by a driving unit 102. The driving unit 102 outputs a driving signal DL' to the gate terminal of the FET11 and a driving signal DH' to the gate terminal of the FET12. In order to drive the FET12, the driving unit 102 generates a power supply voltage V1 between a VH terminal and a GH terminal using a charge pump circuit that includes a capacitor C17 and a diode D12. Here, the primary side control unit 101 may be an IC formed of an analog circuit, or may be a digital operation control unit (such as a CPU or ASIC) that performs operation processing based on a clock signal generated by, e.g., an oscillator.

A primary side power supply generation unit 110 will be described. The primary side power supply generation unit 110 uses a diode D11 and a capacitor C15 to rectify and smooth a forward voltage generated in the auxiliary winding P2 of the transformer T11 and thereby generates a power supply voltage V1. Since the power supply voltage V1 is to be supplied to the driving unit 102 that drives the FET11 and the FET12, the power supply voltage V1 is set to be at least not lower than 10 V, for example. The power supply voltage V1 may also be generated by rectifying and smoothing a flyback voltage generated in the auxiliary winding P2. The primary side power supply generation unit 110 also generates a power supply voltage V2 from the power supply voltage V1 via a series regulator REG103 (hereinafter referred to as an REG103). The power supply voltage V2 is supplied to the primary side control unit 101 and a feedback unit 140. For the purpose of control, stable voltage is required in the primary side control unit 101 and the feedback unit 140. Since the power supply voltage V1 resulting from rectifying and smoothing the voltage of the auxiliary winding P2 varies greatly and is unstable, the REG103 is provided to generate the stable power supply voltage V2. On the secondary side of the isolated DCDC converter 100, a flyback voltage generated in the secondary winding S1 of the transformer T11 is rectified and smoothed by a diode D13 and a smoothing capacitor C18 to generate the power supply voltage Vout.

The feedback unit 140 as a feedback unit will be described. The feedback unit 140 is a circuit for controlling the power supply voltage Vout to be a predetermined constant voltage (hereinafter referred to as a target voltage). The voltage value of the power supply voltage Vout is set based on the voltage division ratio of a voltage Vref input to a reference terminal REF of a shunt regulator IC11 to the power supply voltage Vout. That is, the power supply voltage Vout is set by voltage-dividing resistors R19 and R20. The voltage Vref is at the same potential as a reference voltage Vsh inside the shunt regulator IC11. When the power supply voltage Vout becomes higher than the target voltage, a cathode terminal K of the shunt regulator IC11 pulls current, and a secondary side diode of a photocoupler PC12 conducts via a pull-up resistor R18. Thereafter, when a primary side transistor of the photocoupler PC12 operates, a charge in a capacitor C16 is discharged. The primary side transistor of the photocoupler PC12 has its collector terminal pulled up to the power supply voltage V2 via a resistor R17, and its emitter terminal connected to the DCL. In response to the discharge of the charge in the capacitor C16, the voltage of an FB terminal of the primary side control unit 101 decreases.

When the power supply voltage Vout becomes lower than the target voltage, charging current flows from the power supply voltage V2 to the capacitor C16 via the resistor R17, so that the voltage of the FB terminal of the primary side control unit 101 increases. The primary side control unit 101 controls to maintain the power supply voltage Vout at the target voltage by turning on and off the FET11 and the FET12 based on a voltage signal input to the FB terminal. Current flowing when the capacitor C16 is charged from the power supply voltage V2 via the resistor R17 is denoted by Ifb, and current flowing when the charge in capacitor C16 is discharged via the photocoupler PC12 is denoted by Ic. A voltage Vfb denotes the voltage of the FB terminal of the primary side control unit 101.

An output voltage selection unit 160 as a selection unit will be described. The output voltage selection unit 160 has a function of selecting the target voltage of the power supply voltage Vout. When a Vout CHG signal is set at low level by, e.g., a control unit (not shown) of an apparatus incorporating the power supply apparatus, a field-effect transistor 16 (hereinafter referred to as an FET16) as a first output selection switch is turned off. Therefore, the feedback unit 140 performs the above-described operation, i.e., the feedback control in which the power supply voltage Vout is set by the voltage-dividing resistors R19 and R20. When the low-level Vout CHG signal is output, a field-effect transistor 17 (hereinafter referred to as an FET17) as a second output selection switch is also turned off. Therefore, current flowing to a secondary diode of a photocoupler PC13 stops, and a primary side transistor of the photocoupler PC13 is turned off. The primary side transistor of the photocoupler PC13 has its collector terminal pulled up to the power supply voltage V2 via a resistor R25, and its emitter terminal connected to the DCL. In response to the primary side transistor of the photocoupler PC13 turned off, a high-level signal is input to a 24/5 terminal of the primary side control unit 101.

When a high-level Vout CHG signal is output, the FET16 is turned on to cause the resistors R20 and R24 to be connected in parallel. This changes the voltage division ratio of the voltage input to the REF terminal of the shunt regulator IC11 to the power supply voltage Vout, resulting in a change in the target voltage of the power supply voltage Vout. Compared with the case where the low-level Vout CHG signal is output, the target voltage of the power supply voltage Vout increases. In the first embodiment, it is assumed that the target voltage of the power supply voltage Vout is 5 V for the low-level Vout CHG signal, and 24 V for the high-level Vout CHG signal. When the high-level Vout CHG signal is output, the FET17 is also turned on. Since current flows from the power supply voltage Vout to the diode of the photocoupler PC13 via a resistor R26, current also flows from the power supply voltage V2 to the transistor of the photocoupler PC13 via the resistor R25. Thus, a low-level signal is input to the 24/5 terminal of the primary side control unit 101.

An AC power supply voltage detection unit 180 (a second detection unit) will be described. The AC power supply voltage detection unit 180 inputs a voltage resulting from dividing the input voltage Vin by resistors R11 and R12 to an ACV terminal of the primary side control unit 101. This enables the primary side control unit 101 to detect the input voltage Vin and calculate the voltage of the AC power supply AC11 from the value of the detected input voltage Vin.

[Input and Output Between Blocks of Power Supply Apparatus]

Figure 2:
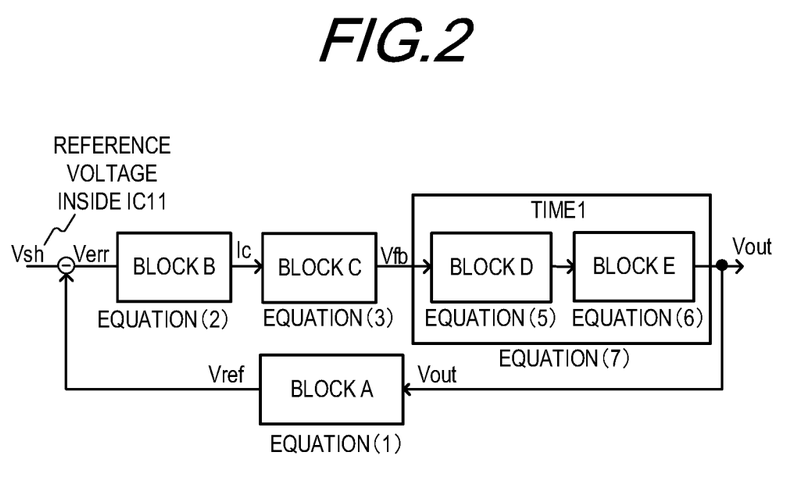
FIG. 2 is an input/output and control block diagram in the first and second embodiments.

Now, control of the power supply apparatus in the first embodiment will be described with reference to the circuit diagram of FIG. 1 and a control block diagram of FIG. 2. The names of blocks in FIG. 2 correspond to the names indicated in FIG. 1. First, block A (a first detection unit) takes a power supply voltage Vout as an input and outputs a voltage Vref to be input to the reference terminal REF of the shunt regulator IC11. In block A, when the Vout CHG signal is at low level, the power supply voltage Vout is divided by the resistors R19 and R20 as indicated in equation (1), and no variables other than the input and the output exist.

$$V_{ref} = \frac{R_{20}}{R_{19} + R_{20}} \cdot V_{out} \qquad \text{Equation (1)}$$

In Equation (1), R19 is the resistance value of the resistor R19, and R20 is the resistance value of the resistor R20. When the Vout CHG signal is at high level, the value of the voltage Vref changes due to a change in the voltage division ratio. Still, the input is the power supply voltage Vout and the output is the voltage Vref, and no variables other than the input and the output exist.

Next, block B takes a difference voltage Verr between the voltage Vref and a reference voltage Vsh inside the shunt regulator IC11 as an input and outputs a current Ic to flow to the primary side transistor of the photocoupler PC12. As indicated in equation (2), block B is configured to output a value proportional to the difference voltage Verr. No variables other than the input and the output exist.

$$I_c = \alpha \cdot V_{err} \qquad \text{Equation (2)}$$

In Equation (2), α is a proportionality constant.

Next, block C takes the current Ic flowing to the primary side transistor of the photocoupler PC12 as an input and outputs a voltage Vfb, which is the voltage of the FB terminal. As indicated in equation (3), block C is configured to integrate the current Ic.

$$V_{fb} = \int \left( \frac{I_{fb} - I_c}{C_{16}} \right) dt \qquad \text{Equation (3)}$$

In Equation (3), C16 is the capacitance of the capacitor C16, and Ifb is the current charged to the capacitor C16 from the power supply voltage V2 via the resistor R17. If a constant-current source is used for the feedback unit 140, the current Ifb is a constant value: therefore, block C is a block that integrates the current Ic and outputs the voltage Vfb of the FB terminal. No variables other than the input and the output exist. With the combination of the proportional operation in block B and the integration operation in block C, the feedback unit 140 performs what is called PI control.

In contrast, if a constant-voltage source is used for the feedback unit 140 as in the first embodiment, the current Ifb is a variable that depends on the voltage Vfb of the FB terminal as indicated in equation (4).

$$V_{fb} = V_2 - R_{17} \cdot I_{fb} \qquad \text{Equation (4)}$$
$$I_{fb} = \frac{V_2 - V_{fb}}{R_{17}}$$

In Equation (4), V2 is the voltage of the power supply voltage V2, and R17 is the resistance value of the resistor R17.

As indicated in equation (4), since the current Ifb is not constant, equation (3) will not be an equation that integrates the current Ic and outputs the voltage Vfb of the FB terminal. For equation (3) to be an equation that integrates the current Ic and outputs the voltage Vfb of the FB terminal, the current Ifb needs to be constant. That is, based on equation (4), the voltage Vfb of the FB terminal needs to be constant. Thus, if a constant-voltage source is used for the feedback unit 140, in order for block C to be an integration operation, the constant-voltage source needs to be used in an extremely narrow range such that the voltage Vfb of the FB terminal is generally constant.

Next, block D takes the voltage Vfb of the FB terminal of the primary side control unit 101 as an input and outputs a conduction time period TIME1 of the FET11. Although the output from block D is described as the conduction time period TIME1 of the FET11, the output may be the duty of a single switching element if a single switching element is used for the isolated DCDC converter 100. In block D, a linear function of the voltage Vfb of the FB terminal is calculated as indicated in equation (5). A coefficient inversely proportional to the input voltage Vin is put at each of the gradient and intercept of the linear function of the voltage Vfb, so that block D is affected by the input voltage Vin. The calculation is performed in the primary side control unit 101.

$$TIME1 = \frac{\gamma}{V_{in}} \cdot V_{fb} + \frac{\delta}{V_{in}} \quad \text{Equation (5)}$$

In Equation (5), γ and δ are constants. The gradient of the linear function of the voltage Vfb is (γ/Vin), and the intercept is (δ/Vin). The gradient and intercept of the linear function include the inverse of the input voltage Vin.

Next, block E takes the conduction time period TIME1 of the FET11 as an input and outputs a power supply voltage Vout. The power supply voltage Vout of the flyback power supply using active clamp, which is the scheme employed by the isolated DCDC converter 100 in the first embodiment, is generally expressed as equation (6). As indicated in equation (6), the power supply voltage Vout proportional to the conduction time period TIME1 of the FET11 is output. Equation (6) suggests that block E is affected by the input voltage Vin.

$$V_{out} = \frac{TIME1}{TIME2} \cdot V_{in}/N_r \quad \text{Equation (6)}$$

In Equation (6), TIME2 is the conduction time period of the FET12, and Nr is the ratio (Np/Ns) between the number of turns Np of the primary winding P1 of the transformer T11 and the number of turns Ns of the secondary winding S1. If a single switching element is used for the isolated DCDC converter 100, TIME1 corresponds to the conduction time period (ON-period) of the single switching element and TIME2 corresponds to the non-conduction time period (OFF-period) of the single switching element.

It can be seen from equation (6) that the power supply voltage Vout is determined by the ratio between the conduction time period TIME1 of the FET11 and the conduction time period TIME2 of the FET12, and the input voltage Vin. Therefore, to control the power supply voltage Vout to be constant, the conduction time period TIME1 of the FET11 and/or the conduction time period TIME2 of the FET12 can be changed to control the ratio between the conduction time period TIME1 of the FET11 and the conduction time period TIME2 of the FET12. In the first embodiment, for example, the power supply voltage Vout is controlled to be constant by changing the conduction time period TIME1 of the FET11 while keeping the conduction time period TIME2 of the FET12 fixed.

With blocks D and E together, equation (7) is derived from equations (5) and (6).

$$V_{out} = \frac{\gamma \cdot V_{fb} + \delta}{TIME2 \cdot N_r} \quad \text{Equation (7)}$$

It can be seen from equation (7) that the influence of the input voltage Vin is removed. This is because the coefficients inversely proportional to the input voltage Vin are put at the gradient and the intercept in block D. Thus, the voltage Vfb of the FB terminal can be kept substantially constant for controlling the power supply voltage Vout to be constant. Keeping the voltage Vfb of the FB terminal constant enables the above-described integration operation in block C. It is to be noted that, in block D, the isolated DCDC converter 100 would conventionally put a coefficient inversely proportional to the input voltage Vin only at the gradient of an equation determining the conduction time period TIME1, as in equation (8).

$$TIME1 = \frac{\gamma}{V_{in}} \cdot V_{fb} + \varepsilon(V_{in}) \quad \text{Equation (8)}$$

In Equation (8), ε(Vin) is a variable as a function of the input voltage Vin.

From equations (6) and (8), equation (9) is derived.

$$V_{out} = \frac{\gamma \cdot V_{fb} + \varepsilon(V_{in}) \cdot V_{in}}{TIME2 \cdot N_r} \quad \text{Equation (9)}$$

It can be seen from equation (9) that, to control the output voltage Vout to be constant, the voltage Vfb of the FB terminal would need to be changed as the input voltage Vin varies: that is, the voltage Vfb of the FB terminal would not be able to be kept constant. This, however, is not a problem if a constant-current source is used for the feedback unit 140.

[Relationship Among TIME1, Vfb and Vin]

Figure 3A:
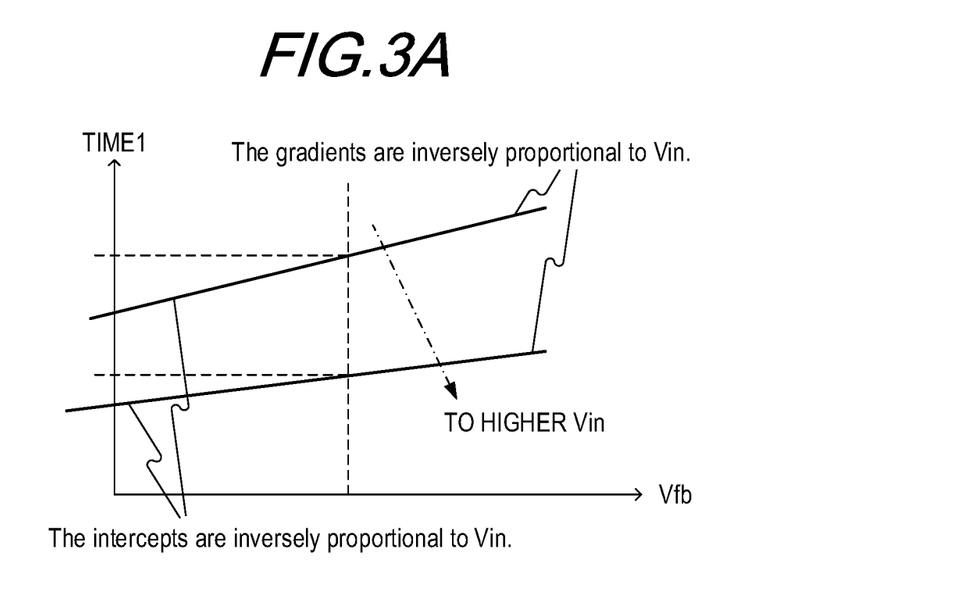
FIG. 3A is a graphical illustration of block D in the first embodiment.
Figure 3B:
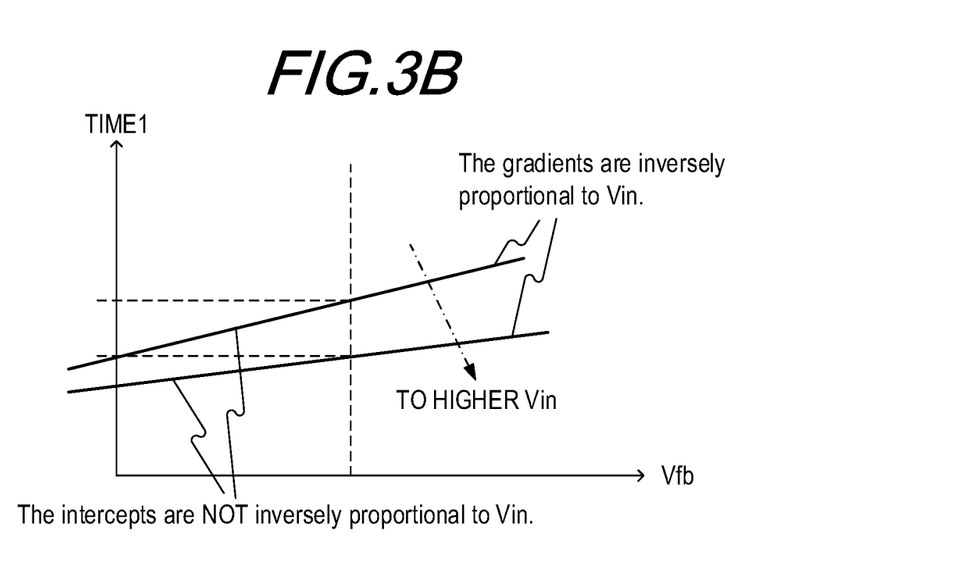
FIG. 3B is a graphical illustration of conventional block D.

FIGS. 3A and 3B graphically illustrate the relationships between the voltage Vfb of the FB terminal and the conduction time period TIME1 of the FET11 in block D. FIG. 3A is a graph illustrating the relationship in the first embodiment (equation (5)), and FIG. 3B is a graph illustrating the conventional relationship (equation (8)). In these graphs, the abscissa indicates the voltage Vfb of the FB terminal, and the ordinate indicates the conduction time period TIME1 of the FET11.

In FIG. 3A, the voltage Vfb of the FB terminal and the conduction time period TIME1 of the FET11 are in a linear function relationship. That is, the conduction time period TIME1 of the FET11 can be represented as a linear function having the voltage Vfb of the FB terminal as a variable, and the gradient (γ/Vin) and intercept (δ/Vin) of the linear function are inversely proportional to the input voltage Vin. Thus, the higher the input voltage Vin, the gentler the gradient and the smaller the intercept. The primary side control unit 101 performs control such that the higher the input voltage Vin, the shorter the conduction time period TIME1 of the FET11 corresponding to the feedback voltage Vfb and the smaller the variation amount of the conduction time period TIME1 of the FET11 corresponding to the variation amount of the feedback voltage Vfb.

In FIG. 3B, as in FIG. 3A, the voltage Vfb of the FB terminal and the conduction time period TIME1 of the FET11 are in a linear function relationship, and the gradient (γ/Vin) of the linear function is inversely proportional to the input voltage Vin. However, the intercept (ε(Vin)) of the linear function in FIG. 3B is not inversely proportional to the input voltage Vin. The intercept of the linear function in FIG. 3B may be a fixed value or may be a function of the input voltage Vin, but is not inversely proportional to the input voltage Vin.

As above, in the first embodiment, the gradient and intercept of the relationship of the conduction time period or duty of the FET11 with the voltage Vfb of the FB terminal are corrected according to the input voltage Vin. As described with reference to FIG. 1, the primary side control unit 101 detects the input voltage Vin through the AC power supply voltage detection unit 180 detecting the voltage, which is then input to the ACV terminal of the primary side control unit 101.

Thus, according to the first embodiment, an inexpensive and small-sized power supply apparatus can be realized that achieves both the improvement of responsivity of output voltage and the reduction of ripple of the output voltage within the range of ratings of input voltage.

A second embodiment of the present invention will be described. Only differences from the first embodiment will be described; otherwise, description will be omitted. The same components as in the first embodiment will be labeled with the same symbols and will not be described.

[Relationship Among TIME1, Vfb and Vin]

Figure 4:
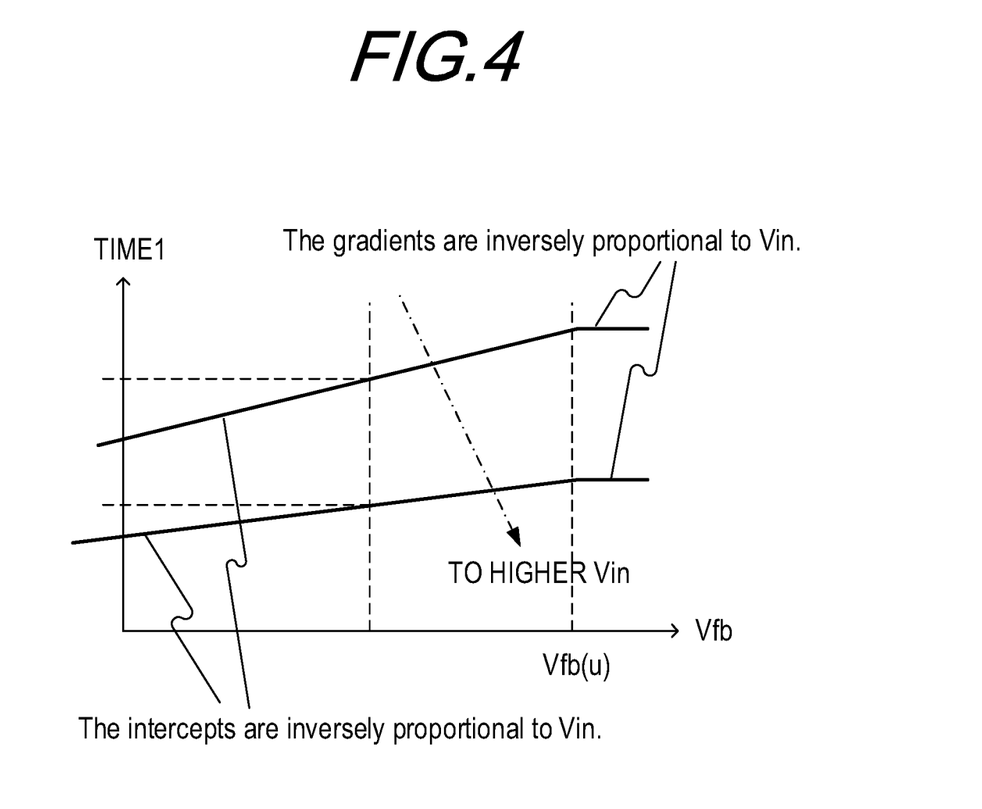
FIG. 4 is a graphical illustration of block D in the second embodiment.

FIG. 4 graphically illustrates the relationship between the voltage Vfb of the FB terminal and the conduction time period TIME1 of the FET11 in block D. In FIG. 4, as in the first embodiment, the voltage Vfb of the FB terminal and the conduction time period TIME1 of the FET11 are in a linear function relationship, and the gradient and intercept of the linear function are inversely proportional to the input voltage Vin. Once the voltage Vfb of the FB terminal exceeds an upper limit value Vfb(u) (a predetermined value), the conduction time period TIME1 of the FET11 is constant. This can prevent the conduction time period TIME1 of the FET11 from becoming unnecessarily long on the occurrence of any anomaly in the voltage Vfb of the FB terminal. An unnecessarily long conduction time period TIME1 may cause an element such as the FET11 to produce heat due to an inflow of a large amount of current, leading to damage to the element or a reduced operational life of the element. Setting the upper limit for TIME1 can prevent flowing of a large amount of current to the FET11.

As above, the upper limit is set for the conduction time period TIME1 of the FET11. This can realize an inexpensive and small-sized power supply apparatus that achieves both high responsivity and low ripple of the power supply voltage Vout within the range of voltage ratings of the input voltage Vin, while preventing damage to the element on the occurrence of an anomaly as much as possible.

Thus, according to the second embodiment, an inexpensive and small-sized power supply apparatus can be realized that achieves both the improvement of responsivity of output voltage and the reduction of ripple of the output voltage within the range of ratings of input voltage.

The power supply apparatus described in the first and second embodiments are applicable, for example, as a low-voltage power supply in an image forming apparatus, i.e., as a power supply that powers a controller (a control unit) and driving units such as motors. Described below is a configuration of an image forming apparatus to which the power supply apparatus in the first and second embodiment is applied.

[Configuration of Image Forming Apparatus]

Figure 5:
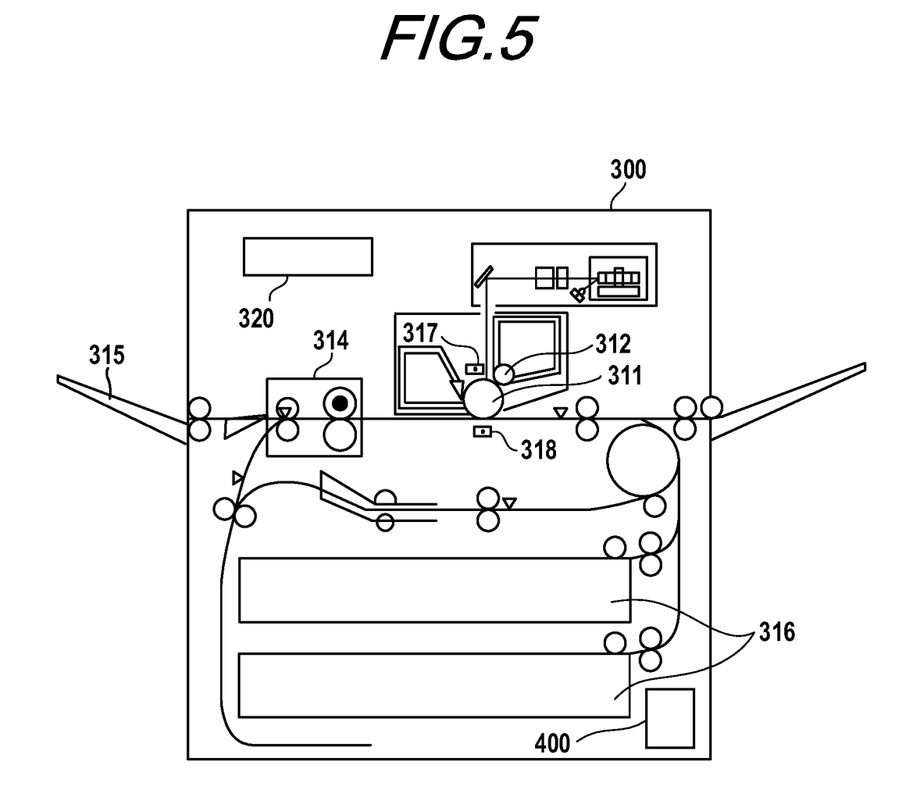
FIG. 5 is a schematic diagram illustrating an image forming apparatus in a third embodiment.

As an exemplary image forming apparatus, a laser beam printer will be described. FIG. 5 illustrates a schematic configuration of a laser beam printer as an example of electrophotographic printers. The laser beam printer 300 includes: a photosensitive drum 311 as an image bearing member on which an electrostatic latent image is formed; a charge device 317 (a charge unit) that uniformly charges the photosensitive drum 311; and a developing device 312 (a developing unit) that develops with toner the electrostatic latent image formed on the photosensitive drum 311. A transfer device 318 (a transfer unit) transfers the toner image developed on the photosensitive drum 311 onto a sheet (not shown), which is a recording material, fed from a cassette 316. A fixing device 314 then fixes the toner image transferred on the sheet and ejects the sheet onto a tray 315. The photosensitive drum 311, the charge device 317, the developing device 312 and the transfer device 318 constitute an image forming unit. The laser beam printer 300 also includes, as a power supply apparatus 400, the power supply apparatus described in the first and second embodiment. The image forming apparatus to which the power supply apparatus in the first and second embodiment is applicable is not limited to the apparatus exemplified in FIG. 5, but may be an image forming apparatus that includes multiple image forming units, for example. Further, the image forming apparatus may include a primary transfer device for transferring a toner image on the photosensitive drum 311 onto an intermediate transfer belt and a secondary transfer device for transferring the toner image on the intermediate transfer belt onto a sheet.

The laser beam printer 300 includes a controller 320 that controls image forming operation of the image forming unit and sheet conveying operation, and the power supply apparatus 400 powers the controller 320, for example. The power supply apparatus 400 also powers driving units such as motors for rotating the photosensitive drum 311 or for driving various rollers that convey sheets.

In stand-by state for achieving power saving (for example, power-saving mode or stand-by mode), the image forming apparatus in the third embodiment can reduce energy consumption by reducing the load, for example by powering only the controller 320. That is, in the image forming apparatus in the third embodiment, in power-saving mode, the controller 320 sets the Vout CHG signal (the signal for directing to select the target voltage of the power supply voltage Vout) at low level to switch the target voltage of the power supply voltage Vout to 5 V. In normal mode in which image forming is performed, the controller 320 sets the Vout CHG signal at high level to switch the target voltage of the power supply voltage Vout to 24 V. In either mode, the conduction time period TIME1 of the FET11 of the power supply apparatus 400 is determined as a linear function having the voltage Vfb of the FB terminal as a variable, where the gradient and intercept of the linear function are inversely proportional to the input voltage Vin. Therefore, the power supply voltage Vout does not depend on the input voltage Vin. This enables performing the integration in block C with a constant voltage Vfb of the FB terminal of the primary side control unit 101, thereby controlling the power supply voltage Vout to be constant.

Thus, according to the third embodiment, an inexpensive and small-sized power supply apparatus can be realized that achieves both the improvement of responsivity of output voltage and the reduction of ripple of the output voltage within the range of ratings of input voltage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-188213, filed Sep. 28, 2017, which is hereby incorporated by reference herein in its entirety.

What is claimed is:

1. A power supply apparatus comprising:
a transformer configured to isolate a primary side and a secondary side;
a switching unit provided on the primary side of the transformer and configured to perform switching operation for converting an input voltage in which an AC voltage are rectified and smoothed and outputting an output voltage from the secondary side of the transformer;
a first detection unit configured to detect the output voltage;
a feedback unit configured to generate a feedback voltage based on the output voltage detected by the first detection unit;
a control unit configured to control the switching operation of the switching unit based on the feedback voltage generated by the feedback unit; and
a second detection unit configured to detect the AC voltage,
wherein the control unit performs the switching operation such that the higher the AC voltage detected by the second detection unit, the shorter a conduction time period of the switching unit corresponding to the feedback voltage and the smaller a variation amount of the conduction time period of the switching unit corresponding to a variation amount of the feedback voltage.

2. A power supply apparatus according to claim 1, wherein the conduction time period of the switching unit is represented by a linear function whose variable is the feedback voltage, and each of a gradient and an intercept of the linear function includes an inverse of the AC voltage.

3. A power supply apparatus according to claim 1, wherein the control unit sets the conduction time period of the switching unit at a constant value if the feedback voltage exceeds a predetermined value, and
the higher the AC voltage, the smaller the constant value.

4. A power supply apparatus according to claim 1, wherein the power supply apparatus comprises a selection unit configured to select a target voltage of the output voltage, and
the control unit controls the conduction time period of the switching unit according to the target voltage.

5. A power supply apparatus according to claim 1, wherein the feedback unit has a constant-voltage source.

6. A power supply apparatus according to claim 1, wherein the switching unit includes a first switching element connected in series to a primary winding of the transformer and a second switching element connected in parallel to the primary winding of the transformer, and includes a capacitor connected in series to the second switching element and connected in parallel to the primary winding of the transformer along the second switching element,
the control unit controls turning on or off the first switching element and the second switching element based on the feedback voltage from the feedback unit, and
the control unit is capable of performing operation of alternately repeating a first period and a second period, the first period involving performing switching operation of selectively turning on or off the first switching element and the second switching element before and after a dead time during which the first switching element and the second switching element are both turned off, and the second period involving suspending the switching operation.

7. An image forming apparatus comprising:
an image forming unit for forming an image; and
a power supply apparatus configured to power the image forming apparatus,
wherein the power supply apparatus comprises:
a transformer configured to isolate a primary side and a secondary side;
a switching unit provided on the primary side of the transformer and configured to perform switching operation for converting an input voltage in which an AC voltage are rectified and smoothed and outputting an output voltage from the secondary side of the transformer;
a first detection unit configured to detect the output voltage;
a feedback unit configured to generate a feedback voltage based on the output voltage detected by the first detection unit;
a control unit configured to control the switching operation of the switching unit based on the feedback voltage generated by the feedback unit; and
a second detection unit configured to detect the AC voltage,
wherein the control unit performs the switching operation such that the higher the AC voltage detected by the second detection unit, the shorter a conduction time period of the switching unit corresponding to the feedback voltage and the smaller a variation amount of the conduction time period of the switching unit corresponding to a variation amount of the feedback voltage.

8. An image forming apparatus according to claim 7, wherein the conduction time period of the switching unit is represented by a linear function whose variable is the feedback voltage, and each of a gradient and an intercept of the linear function includes an inverse of the AC voltage.

9. An image forming apparatus according to claim 7, wherein the control unit sets the conduction time period of the switching unit at a constant value if the feedback voltage exceeds a predetermined value, and
the higher the AC voltage, the smaller the constant value.

10. An image forming apparatus according to claim 7, wherein the power supply apparatus comprises a selection unit configured to select a target voltage of the output voltage,
the control unit controls the conduction time period of the switching unit according to the target voltage, and
the image forming apparatus comprises a controller configured to output a signal directing the selection unit to select the target voltage of the output voltage.

11. An image forming apparatus according to claim 7, wherein the feedback unit has a constant-voltage source.

12. An image forming apparatus according to claim 7, wherein the switching unit includes a first switching element connected in series to a primary winding of the transformer and a second switching element connected in parallel to the primary winding of the transformer, and includes a capacitor connected in series to the second switching element and connected in parallel to the primary winding of the transformer along the second switching element,
the control unit controls turning on or off the first switching element and the second switching element based on the feedback voltage from the feedback unit, and
the control unit is capable of performing operation of alternately repeating a first period and a second period, the first period involving performing switching operation of selectively turning on or off the first switching element and the second switching element before and after a dead time during which the first switching element and the second switching element are both turned off, and the second period involving suspending the switching operation.

13. An image forming apparatus according to claim 7, wherein the image forming apparatus comprises:
a controller configured to control the image forming unit; and
a driving unit configured to drive the image forming unit, wherein the power supply apparatus powers the controller or the driving unit.

* * * * *